(12) United States Patent
Keshavarzian et al.

(10) Patent No.: US 10,629,040 B2
(45) Date of Patent: Apr. 21, 2020

(54) ENERGY EFFICIENT INTRUSION DETECTION SYSTEM

(71) Applicant: Robert Bosch GmbH, Stuttgart (DE)

(72) Inventors: Abtin Keshavarzian, Mountain View, CA (US); Christian Peters, Palo Alto, CA (US); Maurizio Bocca, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 29 days.

(21) Appl. No.: 16/066,575

(22) PCT Filed: Dec. 30, 2016

(86) PCT No.: PCT/EP2016/082903
§ 371 (c)(1),
(2) Date: Jun. 27, 2018

(87) PCT Pub. No.: WO2017/114939
PCT Pub. Date: Jul. 6, 2017

(65) Prior Publication Data
US 2019/0005791 A1    Jan. 3, 2019

Related U.S. Application Data

(60) Provisional application No. 62/273,160, filed on Dec. 30, 2015.

(51) Int. Cl.
*G08B 13/00* (2006.01)
*G08B 13/22* (2006.01)
(Continued)

(52) U.S. Cl.
CPC ............ *G08B 13/22* (2013.01); *G08B 13/00* (2013.01); *G08B 25/009* (2013.01); *G08B 25/10* (2013.01);
(Continued)

(58) Field of Classification Search
CPC ..... H04W 4/80; H04W 88/02; H04W 64/003; H04W 84/12; H04W 4/023; H04W 84/18;
(Continued)

(56) References Cited

U.S. PATENT DOCUMENTS

| | | | |
|---|---|---|---|
| 2005/0055568 A1* | 3/2005 | Agrawala | G08B 13/2491 726/2 |
| 2008/0198036 A1* | 8/2008 | Songkakul | H04L 12/2838 340/4.32 |

(Continued)

FOREIGN PATENT DOCUMENTS

WO    2015/038040 A1    3/2015

OTHER PUBLICATIONS

International Search Report corresponding to PCT Application No. PCT/EP2016/082903, dated Mar. 22, 2017 (4 pages).

*Primary Examiner* — Daniel Previl
(74) *Attorney, Agent, or Firm* — Maginot, Moore & Beck LLP

(57) ABSTRACT

The intrusion detection system includes a base station and a plurality of sensor nodes communicatively coupled to the base station. The intrusion detection system may be connected to other client devices via a server or a network. The base station sets at least one of the sensor nodes into either a partial system activation mode or full system activation mode. The base station triggers an alarm event including information to a stakeholder in the event an abnormal movement or behavior is detected. The base station transmits a message to the sensor node and deactivates the sensor node. The sensor node return to low power mode.

13 Claims, 13 Drawing Sheets

(51) Int. Cl.
*G08B 25/10* (2006.01)
*G08B 25/00* (2006.01)
*G08B 29/18* (2006.01)
*H04B 17/318* (2015.01)
*H04W 84/18* (2009.01)

(52) U.S. Cl.
CPC ......... *G08B 29/188* (2013.01); *H04B 17/318* (2015.01); *G08B 25/007* (2013.01); *H04W 84/18* (2013.01)

(58) Field of Classification Search
CPC ............... H04W 88/08; H04W 72/082; H04W 12/0017; H04W 12/02; H04W 12/04; H04W 12/12; H04W 76/28; H04W 52/18; H04W 52/245; H04W 52/246; H04W 52/247; H04W 52/265; H04W 52/267; H04W 52/283; H04W 52/48; H04W 72/1226; H04W 74/02; H04W 76/14; H04W 84/22; H04W 88/12; H04W 88/182; H04W 72/044; H04W 12/00503; H04W 12/06; H04W 12/08; H04W 12/0802; H04W 12/10; H04W 16/02; H04W 16/26; H04W 24/10; H04W 28/20; H04W 36/00; H04W 48/00; H04W 48/04; H04W 48/08; H04W 48/14; H04W 48/16; H04W 48/18; H04W 4/02; H04W 4/029; H04W 4/06; H04W 52/0209; H04W 52/10; H04W 52/146; H04W 52/244; H04W 56/00; H04W 64/00; H04W 72/04; H04W 72/0453; H04W 72/1252; H04W 76/10; H04W 76/18; H04W 84/047; H04W 88/06; H04W 8/22; H04W 72/121; G01S 1/685; G01S 5/0236; G01S 5/0252; G01S 5/0289; G01S 5/06; H04B 10/0799; H04B 10/1123; H04B 10/674; H04B 17/318; H04B 1/10; H04B 1/109; H04B 1/16; H04B 7/2615; H04B 7/2656; H04B 1/525; H04B 7/2606; H04K 1/00; H04K 2203/16; H04K 3/22; H04K 3/25; H04K 3/42; H04K 3/45; H04K 3/65; H04K 3/827; H04L 2209/80; H04L 63/0428; H04L 9/0819; H04L 12/2803; H04L 12/2838; H04L 2012/2841; H04L 2012/285; H04L 5/0091; H04L 5/06; H04L 25/02; H04L 25/0226; H04L 25/03; H04L 45/00; H04L 45/302; H04L 47/745; H04L 47/783; H04L 47/805; H04L 47/822; H04L 5/0023; H04L 5/0048; H04L 5/0094; H04L 5/14; H04L 63/0263; H04L 63/107; H04L 63/20; H04L 67/18; H04L 67/303; H04L 12/5695; H04L 5/0007; H04L 5/005; H04L 5/0073; H04L 61/6054; G05B 15/02
USPC ....... 340/541, 552, 825.22, 544, 547, 545.3, 340/545.4, 551, 565, 683, 825.36, 7.51, 340/7.55, 825.49
See application file for complete search history.

(56) References Cited

U.S. PATENT DOCUMENTS

| | | | |
|---|---|---|---|
| 2011/0063110 A1* | 3/2011 | Habib | G08B 13/2491 340/552 |
| 2013/0273938 A1* | 10/2013 | Ng | H04W 64/00 455/456.1 |
| 2014/0342755 A1* | 11/2014 | Youssef | G01S 1/685 455/456.2 |
| 2015/0319796 A1* | 11/2015 | Lu | H04B 7/2615 370/330 |
| 2017/0250786 A1* | 8/2017 | Better | H04L 5/005 |

* cited by examiner

ENERGY EFFICIENT INTRUSION DETECTION SYSTEM

CROSS-REFERENCE TO RELATED APPLICATION

This application is a 35 U.S.C. § 371 National Stage Application of PCT/EP2016/082903, filed on Dec. 30, 2016, which claims the benefit of priority to a U.S. provisional patent application Ser. No. 62/273,160, filed Dec. 30, 2015, the contents of which are incorporated herein by reference as if fully enclosed herein.

FIELD

The patent relates generally to detection systems and, more particularly, to energy efficient intrusion detection system.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure related to systems and methods for detection an intrusion event at a site. A method of detecting an intrusion in a site comprises forming a wireless network among a plurality of sensor nodes, setting the plurality of sensor nodes into at least one of a partial system activation mode or a full system activation mode to collect changes in received signal strength (RSS) at a site, and issuing a message associated with the change in the RSS, the change in the RSS comprises at least one of: an event detected by one of the sensor nodes is normal or abnormal, status of the sensor nodes. In one embodiment, the method of setting the plurality of sensor nodes into at least one of a partial system activation mode or a full system activation mode is carried out at a base station. In another embodiment, the method of issuing the message associated with the change in the RSS is carried out at a base station. At least one of the plurality of sensor nodes or an external device receiving the message issued by the base station. The message, for example, is an event notification, an activation message, and a termination message. The event notification includes at least one of time, date, identity of the sensor node, location of the sensor node, location of an activity event occurred, or an alarm event, wherein the activity event is a vibration event, a movement event, and a breaking event. The activation message includes at least one of an authentication of the sensor node, a verification of the sensor node or an activation of an alarm.

According to another exemplary embodiment of the disclosure, an intrusion detection system comprises a plurality of sensor nodes, each sensor node configured to collect changes in received signal strength (RSS) at a site in at least one of a partial system activation mode or a full system activation mode. The intrusion detection system further comprises a base station for issuing a message associated with the change in the RSS, the change in the RSS comprises at least one of: an event detected by one of the sensor nodes is normal or abnormal, status of the sensor nodes. At least one of the plurality of sensor nodes or an external device receiving the issued message, wherein the issued message is an event notification, an activation message, and a termination message. The event notification includes at least one of time, date, identity of the sensor node, location of the sensor node, location of an activity event occurred, or an alarm event. In one embodiment, the activity event is a vibration event, a movement event, and a breaking event. The activation message includes at least one of an authentication of the sensor node, a verification of the sensor node or an activation of an alarm.

According to yet another exemplary embodiment of the disclosure, a intrusion detection system includes a base station and a plurality of sensor nodes communicatively coupled top the base station. The intrusion detection system may be connected to other client devices via a server or a network. At a low power mode, the sensor node continuously collects and processes any vibration or motion measurements. The sensor node transmits the processed vibration or motion measurements in a formed of data packet to the base station at a very low heartbeat rate. The sensor node further transmits an intrusion event as an event notification to the base station. The base station receives the event notification in turn responds by issuing an activation message and transmits the activation message back to the same sensor node or a different sensor node. The base station sets at least one of the sensor nodes into either a partial system activation mode or full system activation mode. The base station triggers an alarm event including information to a stakeholder in the event an abnormal movement or behavior is detected. The base station transmits a message to the sensor node and deactivates the sensor node.

BRIEF DESCRIPTION OF THE DRAWINGS

These and other features, aspects, and advantages of this disclosure will become better understood when the following detailed description of certain exemplary embodiments is read with reference to the accompanying drawings in which like characters represent like arts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such development effort might be complex and time consuming, but would nevertheless be a routine undertaking of design, fabrication, and manufacture for those of ordinary skill having the benefit of this disclosure.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Figure 1A:
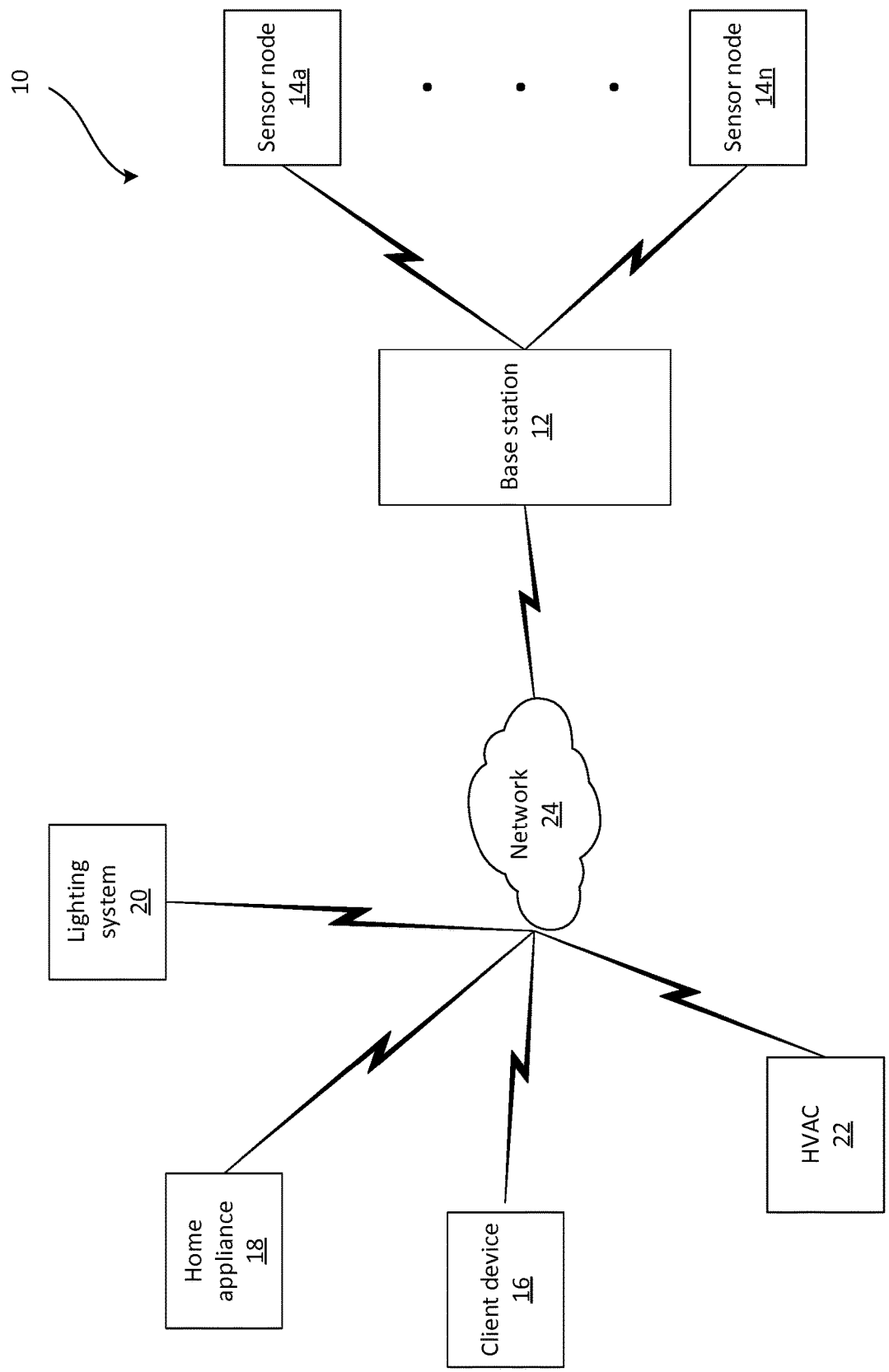
FIG. 1A is block diagram representing an exemplary embodiment of an energy efficient intrusion detection network system, in accordance with a described embodiment.

FIG. 1A illustrates a block diagram of an intrusion detection system network 10 according to an exemplary embodiment of a disclosure. The system network 10 includes a network 24 communicatively coupled to at least one client device 16 and a base station 12 via at least communication links CL in a distributed computing environment. Although only one client device 16 and one base station 12 are illustrated, a plurality of client devices and base stations may be communicatively coupled to the network 24. Each client device and base station may perform same tasks, different tasks assigned to the device and the station. A server may be optionally integrated into the network 24. In some embodiments, one or more servers may be communicatively coupled to the client device 16 and the base station 12 over the network 24. The server may be an application server, a certificate server, a mobile information server, an e-commerce server, a FTP server, a directory server, CMS server, a printer server, a management server, a mail server, a public/private access server, a real-time communication server, a database server, a proxy server, a streaming media server, or the like. The client machine may be a personal computer or desktop computer, a laptop, a cellular or smart phone, a tablet, a personal digital assistant (PDA), a gaming console, an audio device, a video device, an entertainment device such as a television, a vehicle infotainment, a wearable device, or the like. The client machine 16 can in some embodiment be referred to as a single client machine or a single group of client machines, while the server may be referred to as a single server or a single group of servers. In one embodiment a single client machine communicates with more than one server, while in another embodiment a single server communicates with more than one client machine. In yet another embodiment, a single client machine communicates with a single server. The client machine 16 can link to the base station 12 through a number of ways which may be for example by voice input, typing, gesture input, biometric input, and the like.

The network 24 can comprise one or more sub-networks, and can be installed between any combination of the client machines 16, the server, computing machines and home appliances 18, HVAC 22, and lighting systems 20, included within the network system 10. In some embodiments, the network 24 can be for example a local-area network (LAN), a metropolitan area network (MAN), a wide area network (WAN), a primary network comprised of multiple sub-networks located between the client machines 16, the server, computing machines and home appliances 18, HVAC 22, and lighting systems 20, a primary public network with a private sub-network, a primary private network with a public sub-network, or a primary private network with a private sub-network. Still further embodiments include the network 24 that can be any network types such as a point to point network, a broadcast network, a telecommunication network, a data communication network, a computer network, an ATM (Asynchronous Transfer Mode) network, a SONET (Synchronous Optical Network) network, a SDH (Synchronous Digital Hierarchy) network, a wireless network, a wireline network, and the like. Depending on the application, other networks may be used so that data exchanged between the client machine and the server can be transmitted over the network. Network topology of the network 24 can differ within different embodiments which may include a. bus network topology, a star network topology, a ring network topology, a repeater-based network topology, or a tiered-star network topology. Additional embodiments may include a network of mobile telephone networks that use a protocol to communicate among mobile devices, where the protocol can be for example AMPS, TDMA, CDMA, GSM, GPRS, UMTS, LTE or any other protocol able to transmit data among mobile devices. In some embodiments, the base station 12 is a cloud computing device which may be communicated with via the Internet, and which may be co-located or geographically distributed, wherein shared resources, software, and information are provided to computers and other devices on demand for example, as will be appreciated by those skilled in the art. In another embodiment, the cloud base station 12 may be implemented as one or more servers which may be communicated with via the Internet.

The communication link CL may be wired, wireless, or combination thereof. The network system 10 may be used in site such as commonplace in residential area, commercial offices, factories, apartments, schools, public areas, enterprise-wide computer networks, intranets, internets, public computer networks, or combination thereof. The wireless communication link CL may include cellular protocol, data packet protocol, radio frequency protocol, satellite band, infrared channel, or any other protocol able to transmit data among client machines. The wired communication link CL may include any wired line link. As illustrated in FIG. 1A, a plurality of sensor nodes 14a-14n are communicatively coupled to the base station 12 via the communication links CL. The sensor nodes 14a-14n may communicatively couple to one of the client device 16, HVAC 22, home appliance 18, lighting system 10 over the network 24. The sensor nodes 14a-14n are configured to monitor at least one of an event, an activity, or a status present at a site. The base station 12 is configured to issue a message associated with one of the event, the activity, or the status and transmit the message to one of the sensor nodes 14a-14n. The message may be an event notification, an activation message, or a termination message. In some embodiments, the message may be transmitted to the client device 12. In another embodiments, the message may be transmitted to a stakeholder such as home owner, tenant, law enforcer, a security company, or any public service companies. In one embodiment, the sensor nodes 14a-14n and the base station 12 may be installed on a same site. In another embodiment, the sensor nodes 14a-14n and the base station 12 may be installed on a separate site. In yet another embodiment, some of the sensor nodes 14a-14n and the base station 12 may be installed on the same site while the rest of the sensor nodes located in different site(s).

Figure 1B:
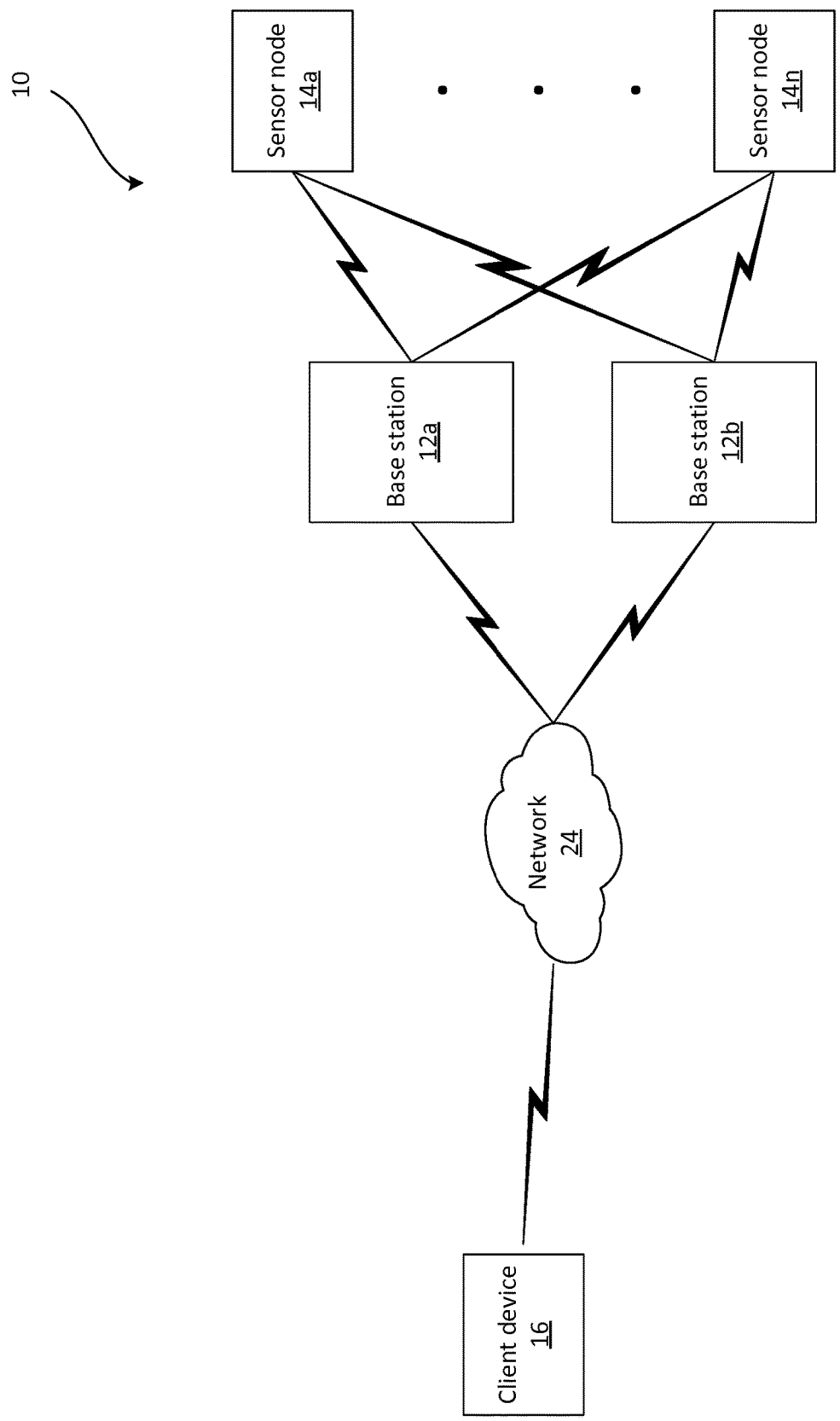
FIG. 1B is block diagram representing alternate embodiment of an energy efficient intrusion detection network system, in accordance with a described embodiment.

FIG. 1B illustrates another described embodiment of a system network 10 in accordance with the teachings of the disclosure. FIG. 1B is similar in construction to the system network 10 as illustrated in FIG. 1A and like elements are identified with a like reference convention. Unlike from FIG. 1A, a single base station 12 communicatively coupled to a plurality of sensor nodes 14a-14n is illustrated. In FIG. 1B, a plurality of sensor nodes 14a-14n are communicatively coupled to a plurality of base stations 12a, 12b. More than two base stations may be incorporated into the system network 10 to facilitate the communication with the sensor nodes 14a-14n, depending on the application. In some embodiments, the base station 12a and the base station 12b may communicate with each other to share and exchange data received from the sensor nodes 14a-14n.

Figure 1C:
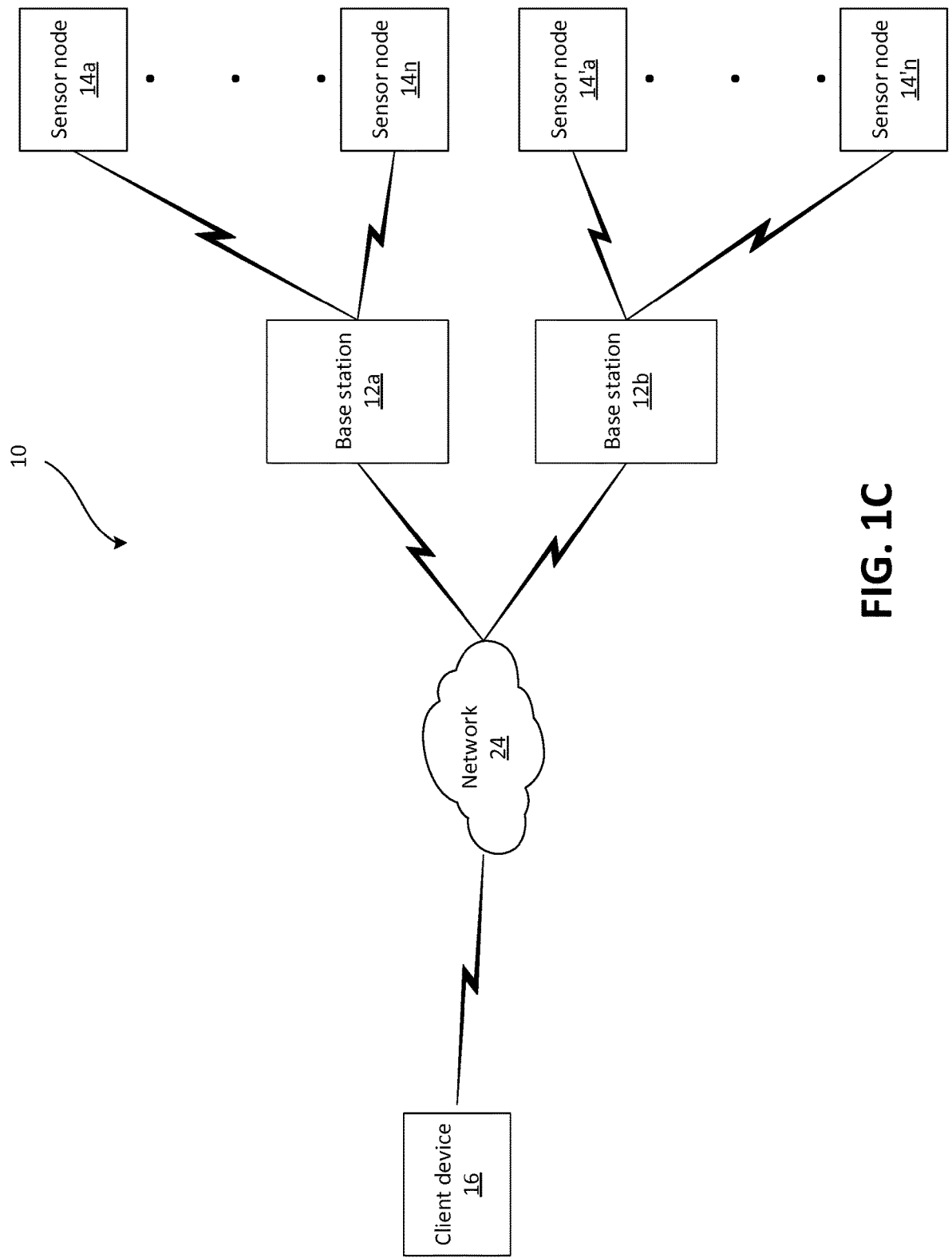
FIG. 1C is block diagram representing alternate embodiment of an energy efficient intrusion detection network system, in accordance with a described embodiment.

FIG. 1C illustrates another described embodiment of a system network 10 in accordance with the teachings of the disclosure. FIG. 1C is similar in construction to the system network 10 as illustrated in FIG. 1B and like elements are identified with a like reference convention. Unlike from FIG. 1B, the network system 10 includes a plurality of base stations 12a, 12b communicatively coupled to the same sensor nodes 14a-14n. In FIG. 1C, the base stations 12a, 12b are separately communicated with different set of sensor nodes 14a-14n, 14'a-14'n. For example, the base station 12a is communicatively coupled to sensor nodes 14a-14n while the base station 12b is communicatively coupled to sensor nodes 14'a-14'n.

Figure 1D:
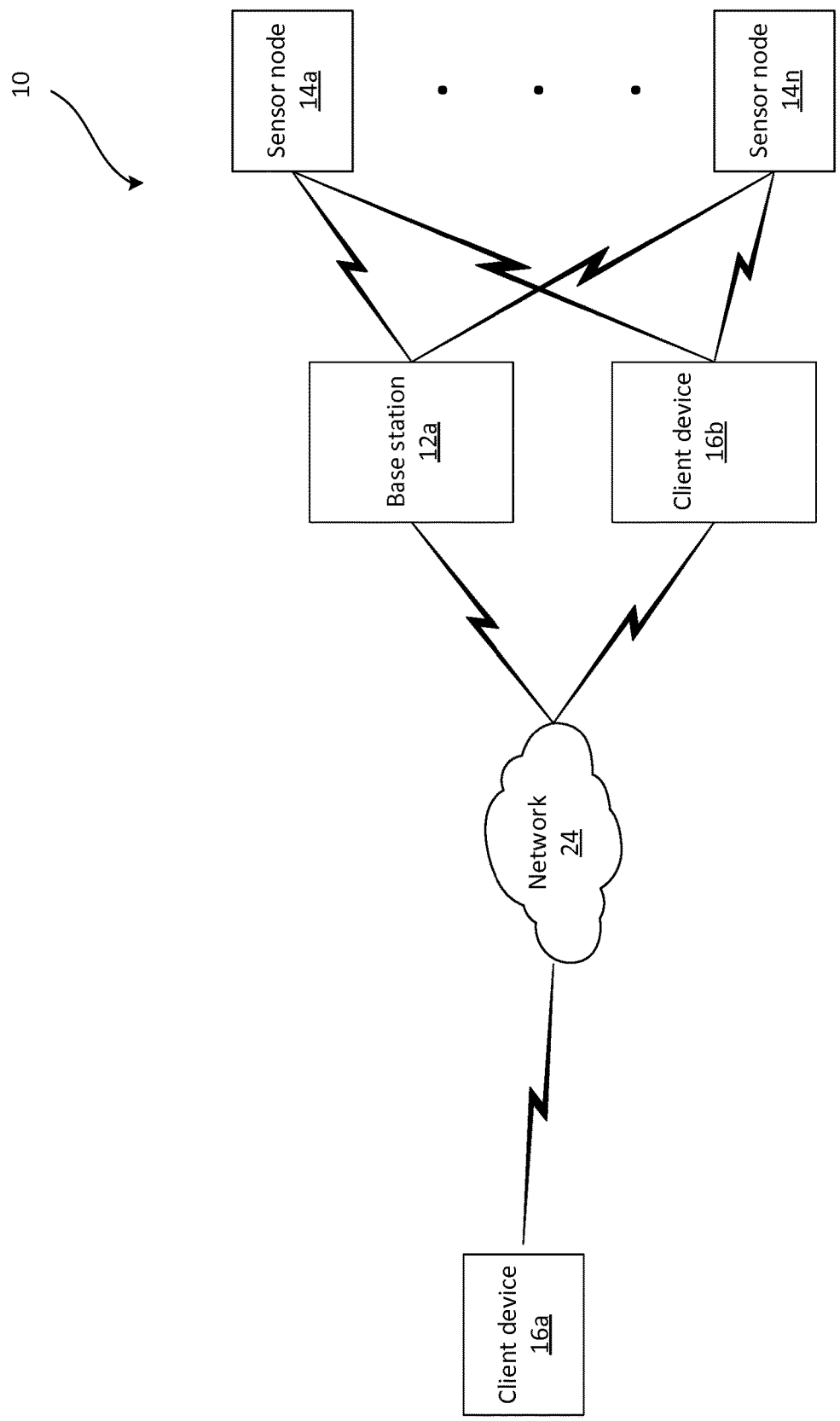
FIG. 1D is block diagram representing alternate embodiment of an energy efficient intrusion detection network system, in accordance with a described embodiment.

FIG. 1D illustrates another described embodiment of a system network 10 in accordance with the teachings of the disclosure. FIG. 1D is similar in construction to the system network 10 as illustrated in FIG. 1B and like elements are identified with a like reference convention. Unlike from FIG. 1B, the plurality of sensor nodes 14a-14n are set up to communicate with the base stations 12a, 12b only. In FIG. 1D, the plurality of sensor nodes 14a-14n are set up to communicate with base station 12 and other devices such as a client device 16b. Although the client device 16b coupled to the sensor nodes 14a-14n are illustrated, other devices such as home appliance 18, HVAC 22, lighting system 20, and any client device may couple to the sensor nodes 14a-14n. In some embodiments, the base station 12 and the client device 16b may communicate with each other to share and exchange data received from the sensor nodes 14a-14n.

Figure 1E:
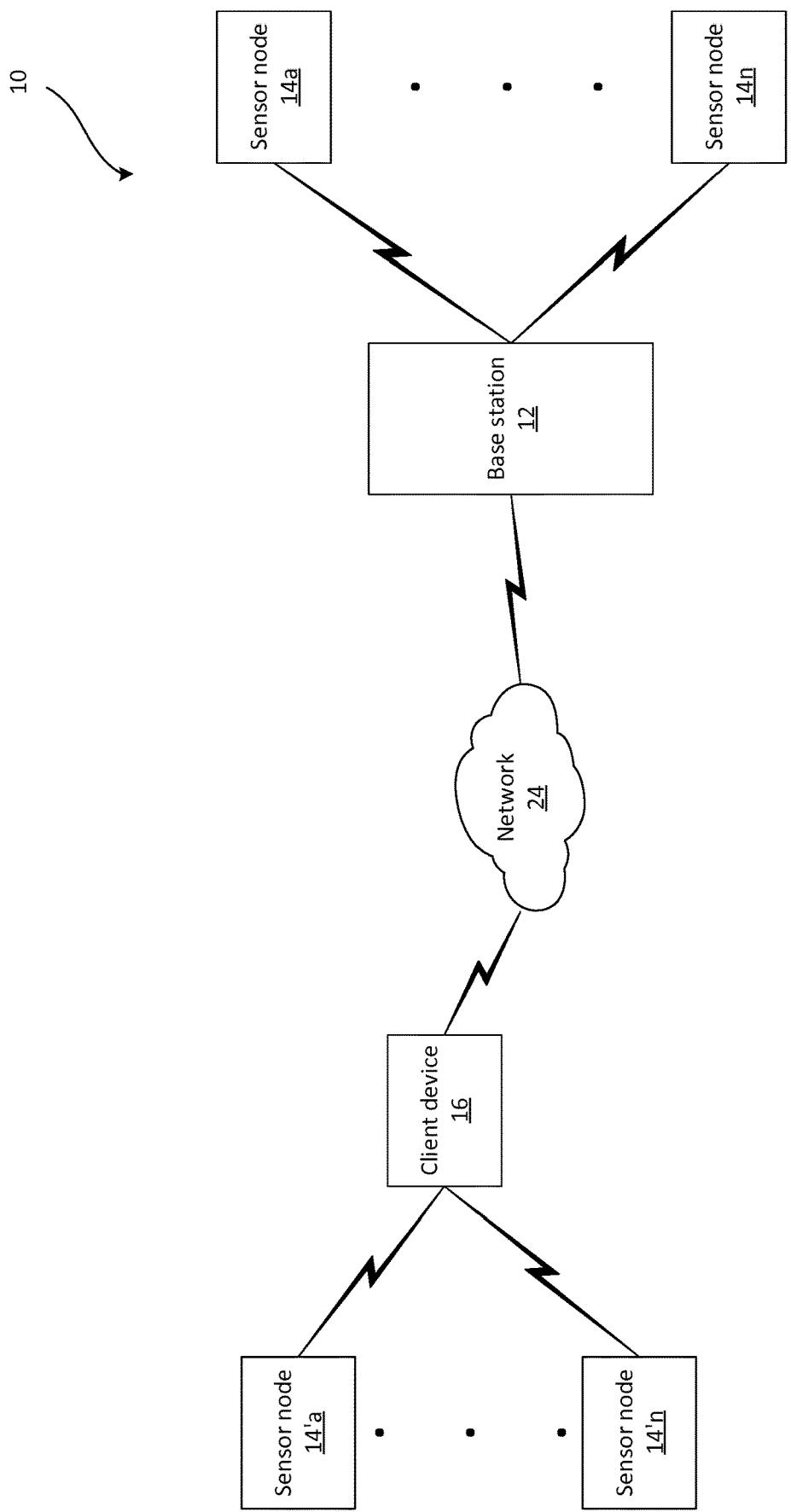
FIG. 1E is block diagram representing alternate embodiment of an energy efficient intrusion detection network system, in accordance with a described embodiment.

FIG. 1E illustrates another described embodiment of a system network 10 in accordance with the teachings of the disclosure. FIG. 1E is similar in construction to the system network 10 as illustrated in FIG. 1C and like elements are identified with a like reference convention. In FIG. 1C, the network system 10 includes two set of sensor nodes 14a-14n, 14'a-14'n separately coupled to two independent base stations 12a, 12b. In FIG. 1E, a base station 12 and a client device 16, are set up to separately couple with different set of sensor nodes 14a-14n, 14'a-14'n. For example, the base station 12 is communicatively coupled to sensor nodes 14a-a 14n and the client device 16 is communicatively coupled to sensor nodes 14'a-14'n. Although the client device 16 coupled to the sensor nodes 14'-14'n are illustrated, other devices such as home appliance 18, HVAC 22, lighting system 20, and any client device may couple to the sensor nodes 14'a-14'n.

Figure 1F:
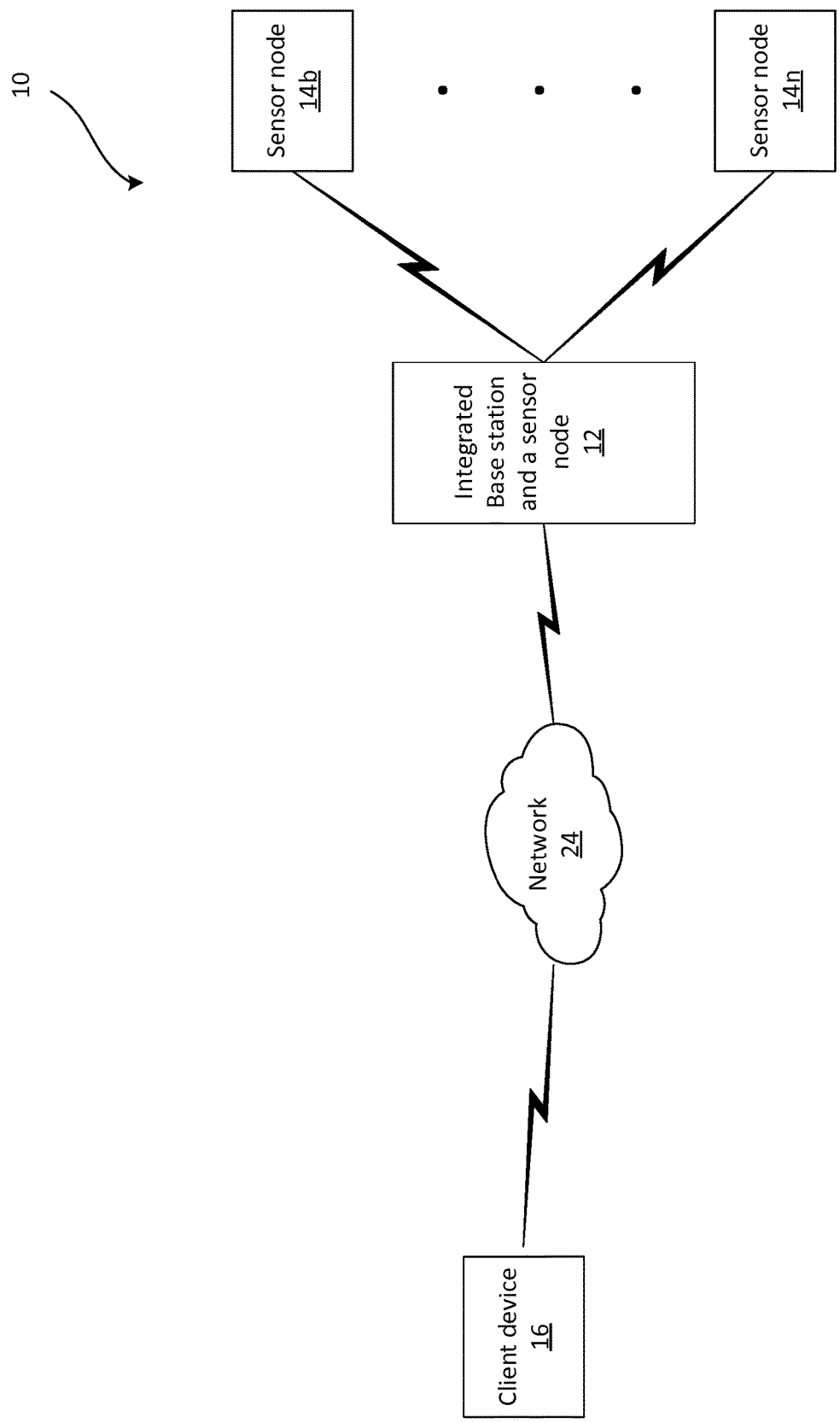
FIG. 1F is block diagram representing alternate embodiment of an energy efficient intrusion detection network system, in accordance with a described embodiment.

FIG. 1F illustrates another described embodiment of a system network 10 in accordance with the teachings of the disclosure. FIG. 1F is similar in construction to the system network 10 as illustrated in FIGS. 1A-1E and like elements are identified with a like reference convention. Unlike from previous system, the sensor node and the base station are two independent and separate devices. In FIG. 1F, one of the sensor node, sensor node 14a is illustrated, is integrated into the base station 12 as a monolithic device which then communicatively coupled the sensor nodes 14b-14n to other devices 16 over the network 24.

Figure 2:
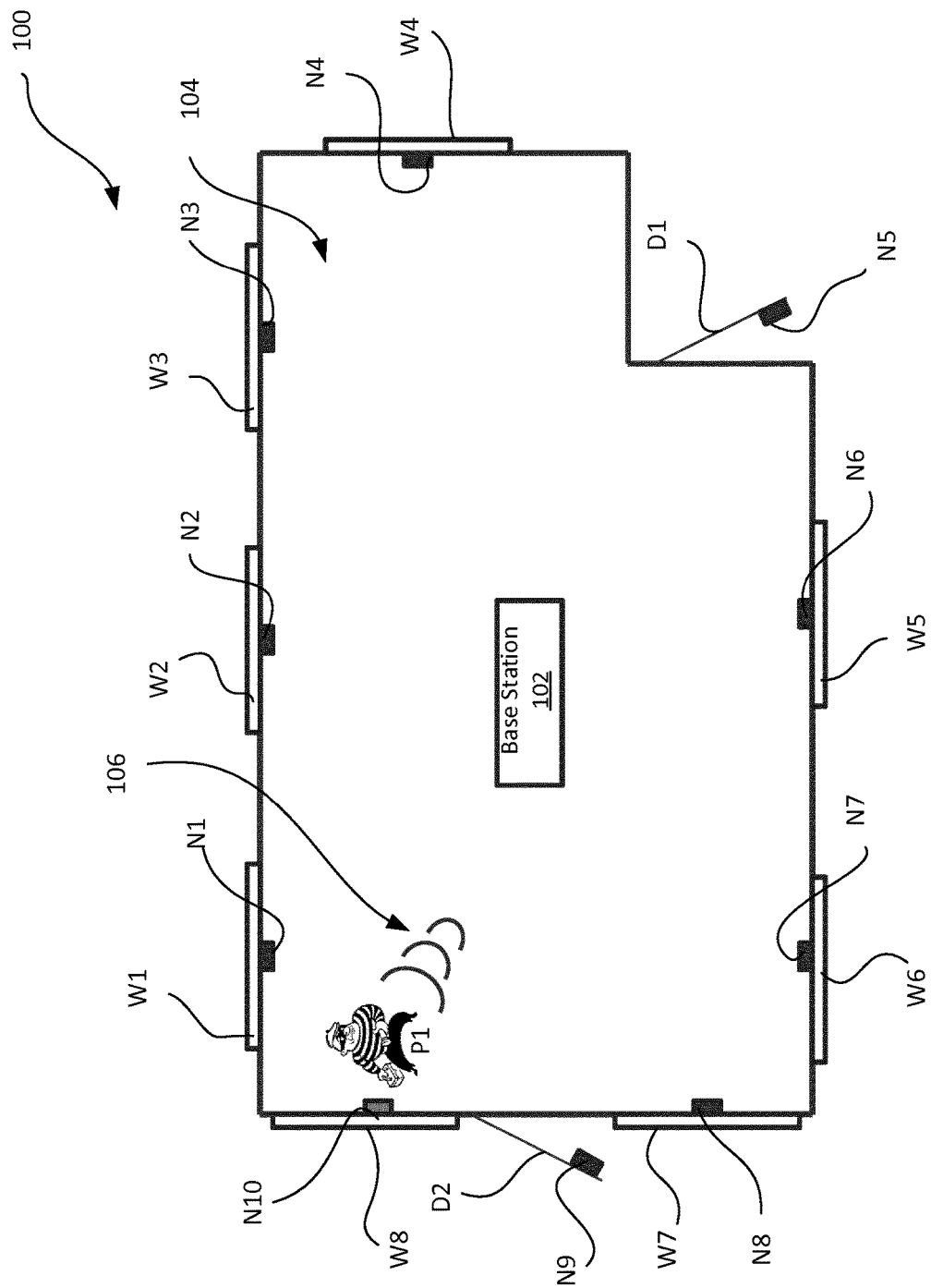
FIG. 2 is a diagram of an exemplary intrusion detection system of FIGS. 1A-1F located in an environment or a site.

FIG. 2 depicts an intrusion detection system 100 implemented in the network system 10. The system 100 includes at least one sensor node, ten sensor nodes N1-N10 are illustrated, and a base station 102 in an environment or an area of interest 104. More or fewer sensor nodes can be incorporated into the system 100, depending on the application. For example, the area of interest 104 with a non-open floor layout in which line of sight communication between the sensor nodes and the base station is limited may require more sensor nodes. In another example, the area of interest 104 with line of sight communication between the sensor nodes and the base station may require fewer sensor nodes. In one embodiment, the sensor nodes N1-N10 may be an inertial sensor. For example, the inertial sensor may be a motion sensor, a thermal sensor, a vibration sensor, an optical sensor, an infrared sensor, a light sensor, an accelerometer, a tomographic sensor, or combination thereof. Other sensor or sensing element are possible, depending on the application. The sensor nodes N1-N10 may be mounted in any area of interest such as a room, a building, an open space, a closed space, or the like. In another embodiment, the sensor nodes N1-N10 may be mounted or integrated into a lighting system, a ventilation system, a home appliance, a HVAC, or the like. Other types of devices (e.g., kitchen appliance, furniture element) available in the environment or a site may include at least one sensor node. As illustrated, the sensor nodes N1-N10 are mounted to windows W1-W8 and doors D1-D2. In one embodiment, the sensor nodes may be mounted to one of the doors and not both doors. In another embodiment, the sensor nodes may be mounted to one or more than one windows but not all the windows.

More than one sensor node may be mounted to the same window or door. In some embodiments, the sensor nodes N1-N10 may be mounted to or integrated for example into a mirror, ceiling, or floor. The sensor nodes N1-N10 are communicatively coupled to the base station 102 either wirelessly and/or through wires. The wireless communication may be, for example, cellular protocol, radio frequency, internet protocol, WiFi, ZigBee, ZWave, or like. The sensor nodes N1-N10 detect or monitor at least one of an event, activity located at or proximal to at least one of the doors and windows or status of the environment using motion or human presence sensing techniques. In some embodiments, sensor nodes N1-N10 monitor the status of their condition. The condition may be for example energy level of a power source or a battery. Other condition of the sensor nodes N11-N10 such as operating condition may be monitored. For example, the sensor node may be configured to perform self-diagnostics. In one embodiment, the motion or human presence sensing technique may be received signal strength (RSS)-based motion detection. One or more sensor nodes emit radio waves and one or more of the other sensor nodes detect when the strength of the received radio waves is disturbed by motion or presence in the area of interest. Once at least one of the event, the activity, or the status is detected by at least one of the sensor nodes, the detected information is transmitted to the base station 102 over a communication link. The transmission of the detected information occurs at a very low rate to reduce the energy consumption of the sensor node. In one embodiment, the transmission occurs regularly. In another embodiment, the transmission occurs periodically or intermittently. For example, the transmission occurs once every couple of either seconds, minutes, hours, days, night, or month. In another example, the transmission occurs more than once every couple either seconds, minutes, hours, days, night, or month. In some embodiments, transmission operation mode of the sensor node may be programmed to occur at a predetermined threshold described above. Alternatively, the sensor node is configured to self-recalibrate the transmission operation mode as necessary, depending on the application, so that the transmission occurs either continuously, regularly, periodically, or intermittently.

As an example illustrated in FIG. 2, a person such as a burglar P1 enters the area of interest 104, a room is illustrated, from the window W8. The sensor node N10 attached to or mounted above the window W8 detects a vibration, movement, or glass breaking event 106 of the window W8, transmits the detected information as an event notification to the base station 102. The base station 102 receives the event notification and in turn responds by transmitting an activation message to the sensor nodes. In one embodiment, the activation message is sent only to the same sensor node that sends the event notification. In alternate embodiment, the activation message is sent to a different sensor node other than the sensor node N10 that sent the event notification. In yet another embodiment, the activation message may be transmitted to both the sensor node N10 that sent the notification and to non-sensor node. For example, the non-sensor node transmits a SOS signal or call for help/assistance associated to the event notification to a stakeholder, e.g. law enforcer, for a service, i.e. rescue. The non-sensor node may be disposed on any home appliances, home furnishing, or any devices available in the room or the site. The event notification includes at least one of the information such as time, date, identity of the sensor node, and identity of the window or door, an alarm event. The activation message includes at least one of the information such as authentication, verification, or activation of the alarm. The alarm may be triggered by one of the sensor nodes and/or the base station. In another embodiment, the alarm may be triggered by any client devices.

Figure 3:
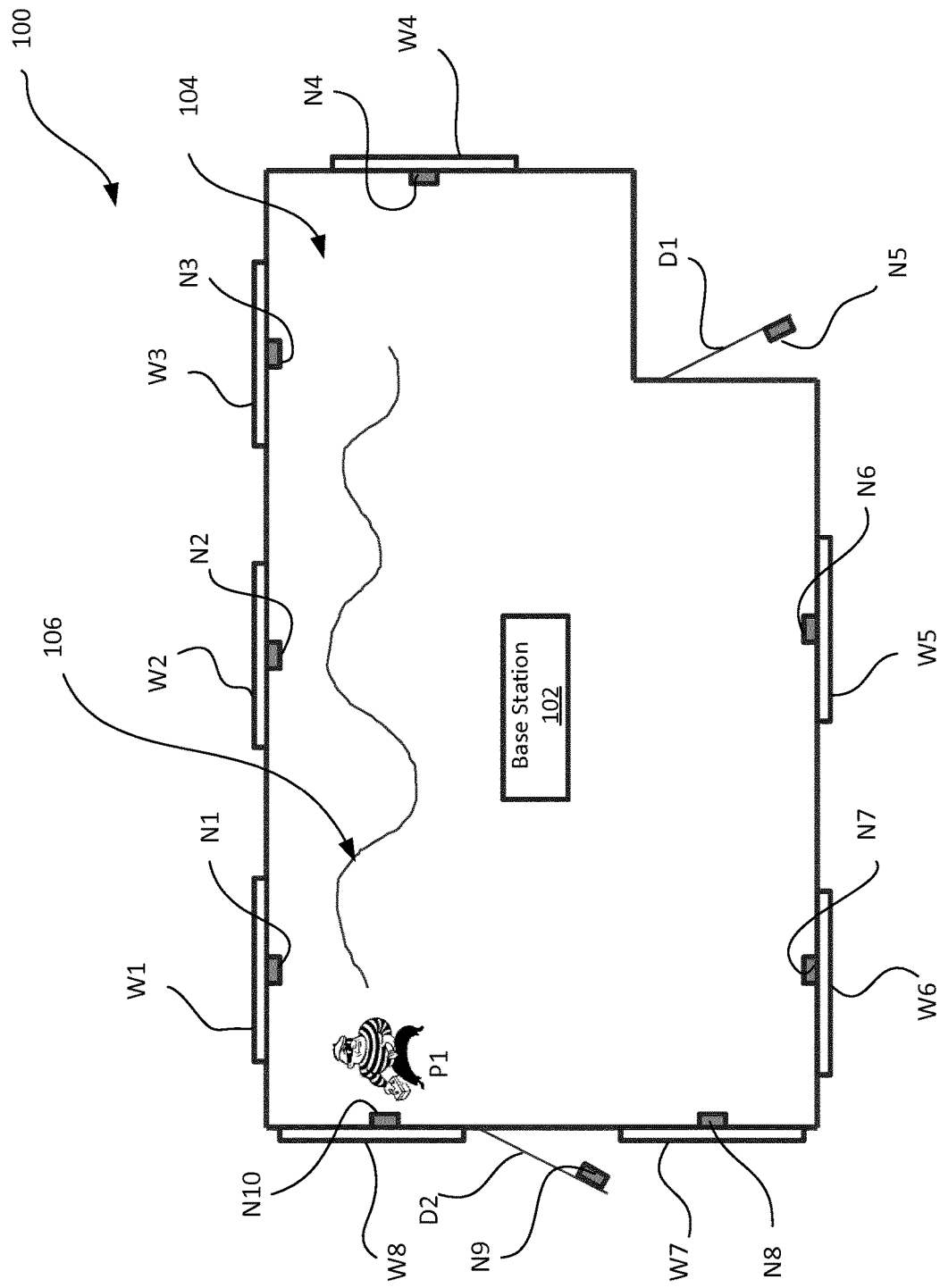
FIG. 3 is a diagram of the system configured to be in tomographic mode in accordance with the described embodiment.
Figure 4:
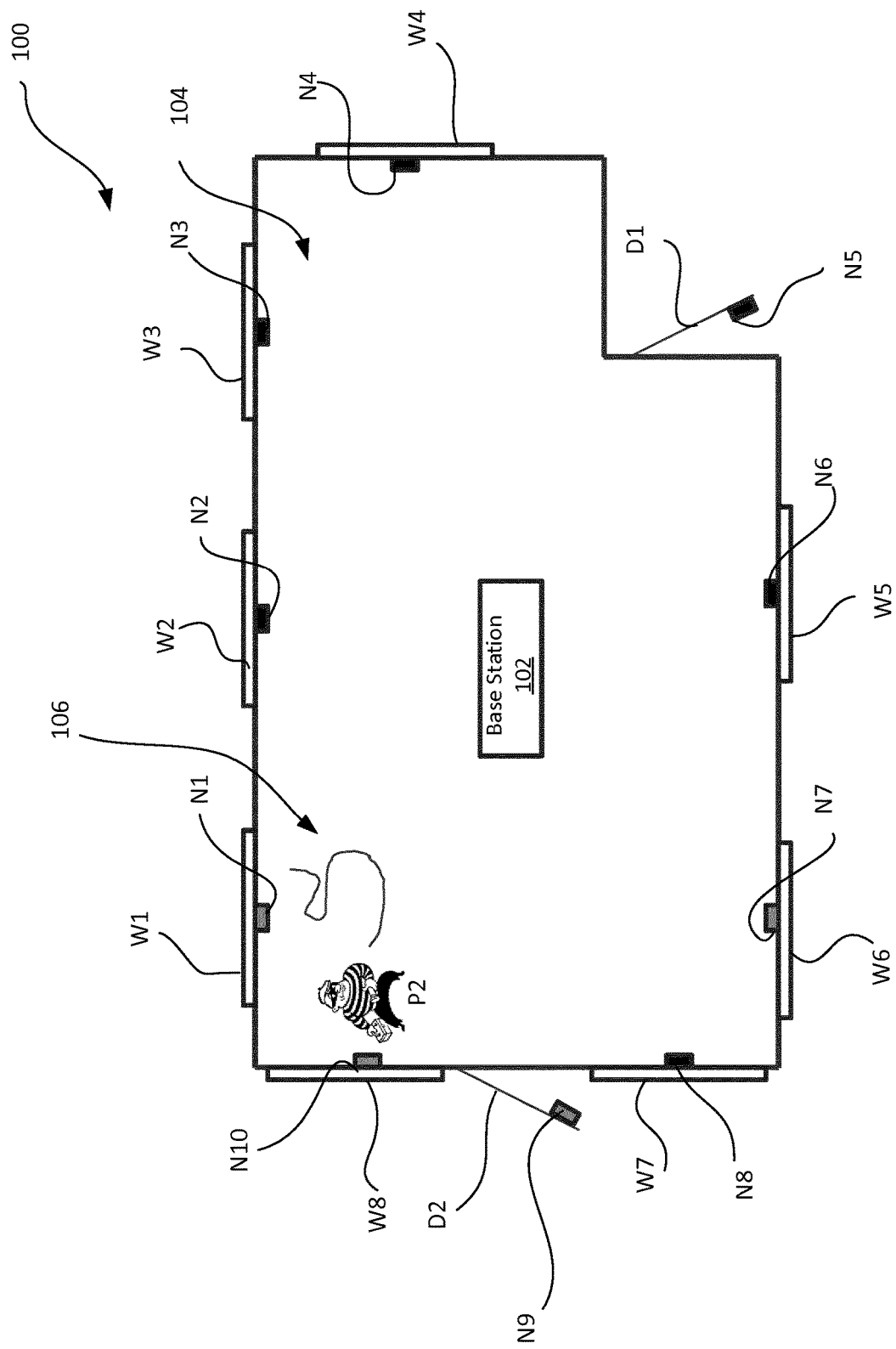
FIG. 4 is a diagram of the system configured to be a partial tomographic mode in accordance with the described embodiment.

Once the alarm event is activated or triggered, the system 100 or at least one of the sensor nodes of the system 100 switches from the motion/vibration monitoring mode to a radio-based monitoring mode, as illustrated in FIG. 3. In the radio-based monitoring mode, the sensor nodes N1-N10 transmit radio signals to the base station at a higher rate. In this mode, the system 100 or the sensor nodes require more power consumption for continuously monitoring the motion occurred in the area of interest 104. The event or activities are measured by monitoring the variation in RSS of at least one of the links connecting at least one of the sensor nodes N1-N10 to the base station 102. Other movement caused or introduced by another person other than the burglar P1 is monitored. In doing so, the system enables the stakeholder such as home owner, law enforcer, Security Company to determine and distinguish whether the movement is abnormal or normal. In the event that the movement is identified as abnormal, i.e. intrusion, the base station 102 sets at least one or more of the sensor nodes N1-N10 into continuous transmitting (TX) mode. In one embodiment, only the sensor node that detects the intrusion and the other sensor nodes proximal or adjacent to that sensor node are set into continuous TX mode, for example in a large area of interest, i.e. office space, building, factory, or the like, as illustrated in FIG. 3. In another embodiment, all sensor nodes in a small area of interest, i.e. an apartment, are set by the base station 102 into continuous TX mode, as illustrated in FIG. 4. The size of the area of interest and the grouping of the deployed sensor nodes can be programmed or predetermined.

The base station 102 continues to monitor and track the location of P1 and provides the monitored or tracked information in addition to time, date, identity of the sensor node, and identity of the window or door, an alarm event to the stakeholder such as home owner, law enforcer, Security Company. In the event that the movement is identified as normal, the base station 102 transmits a message to at least one or more of the sensor nodes N1-N10 to deactivate the RSS detection and return the sensor nodes to motion/vibration mode for sensing next event, activity, or status.

Figure 5:
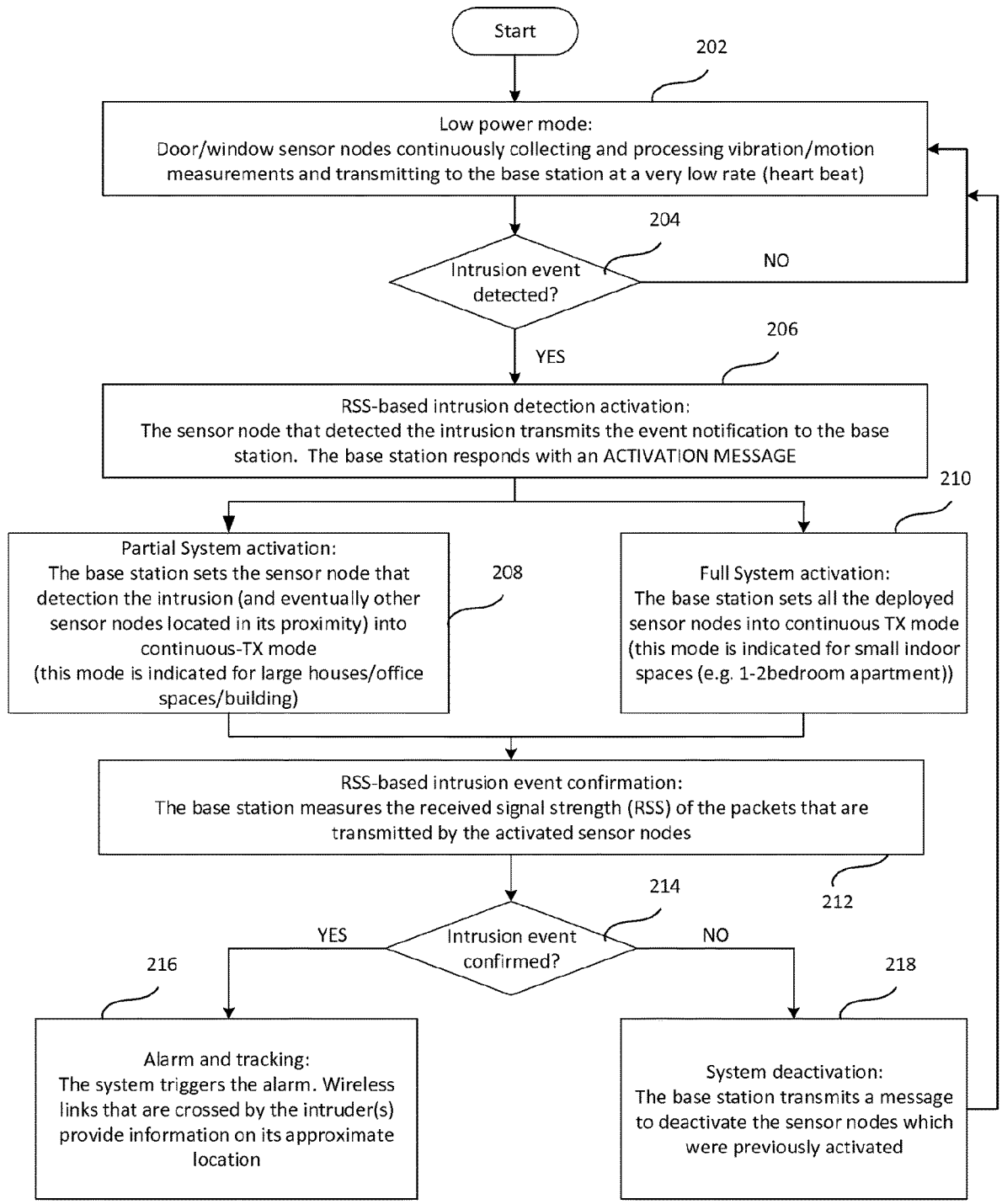
FIG. 5 is a flowchart describing an embodiment of a method for a technique for FIGS. 2-4, in accordance to a described embodiment of disclosure.

FIG. 5 is a flow diagram that illustrates one embodiment of the intrusion detection system 100. At step 202, at least one of the sensor nodes mounted on/above or integrated into the door or the window continuously collects and processes any vibration or motion measurements at a site or an environment. The at least one of the sensor nodes transmits the processed vibration or motion measurements in a formed of data packet to the base station at a very low heartbeat rate. If one of the sensor nodes, at step 204, detects an event such as an intruder or burglar entering into the site, the sensor node that detected the intrusion event as an event notification and transmits an event notification to the base station. The base station and the sensor node that detected the intrusion event may be located in the same site or room, in some embodiments. In other embodiment, the base station and the sensor node that detected the intrusion event may be located in different site or room. In yet another embodiment, the sensor node that detected the intrusion event as an event notification may transmit an event notification to other device such as a client device. The base station or the client device receives the event notification and in turn responds by issuing an activation message and transmits the activation message to the sensor node. In one embodiment, the activation message is sent to the sensor node that sent the event notification. In alternate embodiment, the activation message is sent to a different sensor node other than the sensor node that sent the event notification. In yet another embodiment, the activation message may be transmitted to both the sensor node that sent the notification and other sensor nodes. If no event is detected, the sensor nodes return to low power mode to preserve energy.

Depending on the square footage of the room, the base station may set, control, or place at least one of the sensor nodes into either a partial system activation mode or full system activation mode. If the size of the room is below a predetermined threshold, the base station sets all the deployed sensor nodes into a continuous transmitting (TX) mode, in step 210. Otherwise, the base station sets the sensor node that detects the intrusion event and at least one of the other sensor nodes located in proximal to the base station or that sensor node that detects the intrusion event into a continuous transmitting (TX) mode, in step 208. The size of the room can be programmed or predetermined to a threshold, depending on the application. The event or activities are measured by monitoring the variation in RSS of the at least one of the link connecting the at least one of the sensor nodes to the base station by the base station in step 212. In the event that the base station detects an abnormal movement or behavior at step 214, the base station triggers an alarm event including information to a stakeholder such as home owner, law enforcer, or Security Company in step 216. The information includes time and date when the intrusion occurred, identity of the sensor node, identity of the window or door, location or address of the area of interest when the intrusion occurred, and so forth. Otherwise, at step 218, the base station transmits a message to the sensor node and deactivates the sensor node which was previously activated. The sensor node then returns to low power mode at step 202.

Figure 6:
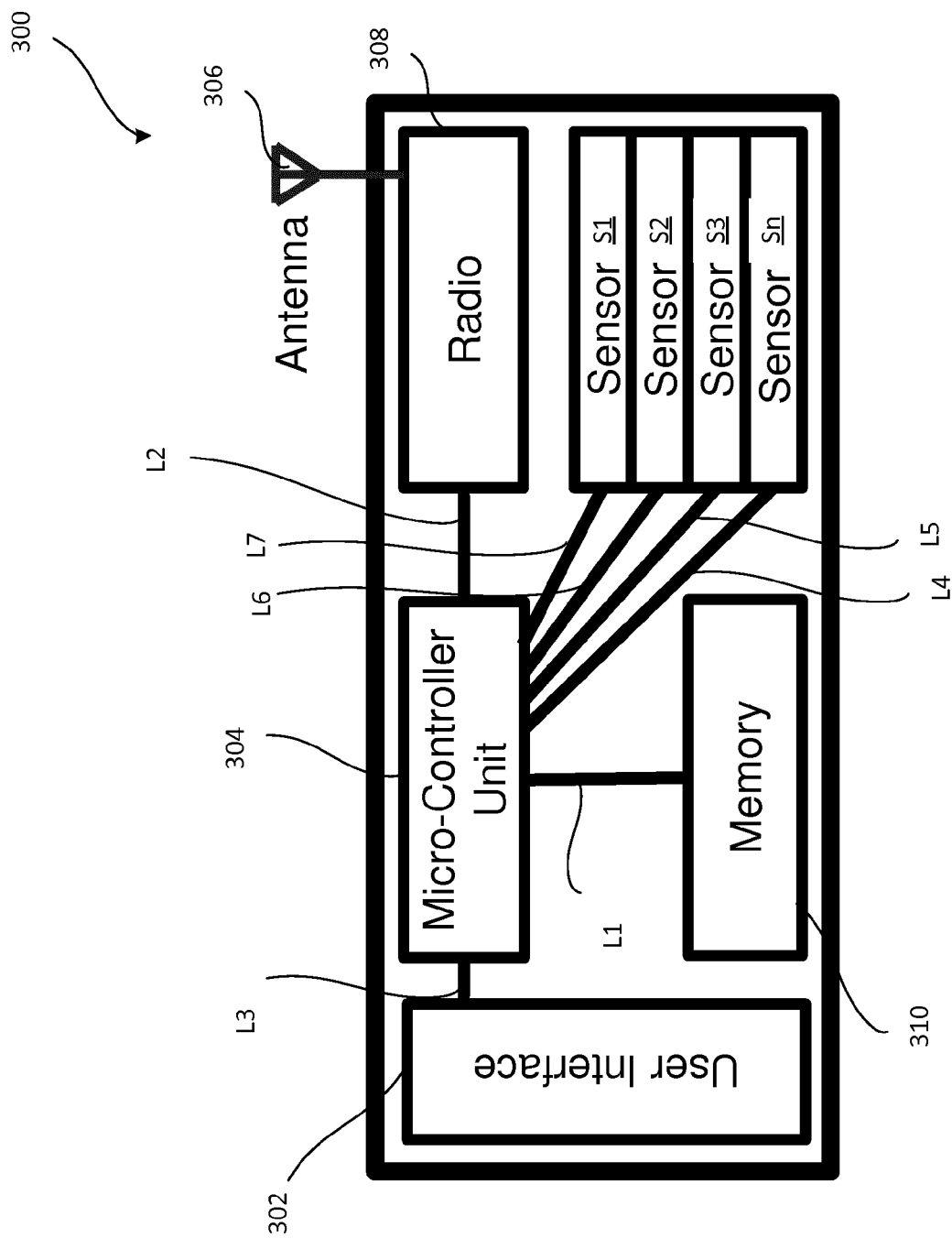
FIG. 6 is a block diagram illustrating a base station in accordance to a described embodiment of a disclosure.

FIG. 6 depicts a base station 300 of an intrusion detection system according to an exemplary embodiment of a described disclosure. The base station 300 includes user interface 302, a processor 304, an antenna 306, a communication interface 308, and a computer readable medium 310. Depending on the application, other computer implemented devices for performing other features not defined herein may be incorporated into the base station 300. Various system buses L1-L7 may be used for communicating between various computer implemented devices, 302, 304, 306, 308, and 310. For example, a memory bus L1 may be used for communicating between the processor 304 and the memory 310. The processor 304 may be of any type, including but not limited to a microprocessor, a microcontroller, a digital signal processor, or any combination thereof. The processor 304 may include one or more levels of caching, such as a level cache memory, one or more processor cores, and registers. Depending on the desired configuration, the processor may be of any type, including but not limited to a microprocessor (μP), a microcontroller (μC), a digital signal processor (DSP), or any combination thereof. The processor may include one more levels of caching, such as a level cache memory, one or more processor cores, and registers. The example processor cores may (each) include an arithmetic logic unit (ALU), a floating point unit (FPU), a digital signal processing core (DSP Core), or any combination thereof. An example memory controller may also be used with the processor, or in some implementations the memory controller may be an internal part of the processor.

The memory or computer readable medium 310 may be of any type including but not limited to volatile memory (such as RAM), non-volatile memory (such as ROM, flash memory, etc.) or any combination thereof. The memory may include an operating system, a communication application, and program data. The communication interface 308 allows software and data to be transferred between the computer system and other external electronic devices in the form of signals which may be, for example, electronic, electromagnetic, optical, or other signals capable of being received by the communication interface. The communication interface may be for example a modem, a network interface, a communication port, a PCM-CIA slot and card, or the like. The antenna 306 is communicatively coupled to the communication interface 308. The user interface 302 includes various end user interfaces such as a display, a keyboard, a joystick, a mouse, a trackball, a touch pad, a touch screen or tablet input, a foot control, a servo control, a game pad input, an infrared or laser pointer, a camera-based gestured input, and the like capable of controlling different aspects of the machine operation. For example, user can input information by typing, touching a screen, saying a sentence, recording a video, or other similar inputs. The base station 300 further includes a plurality of sensors S1-Sn communicatively coupled to other internal components via the processor 304 through links L4-L7. The sensors S1-Sn may be an inertial sensor. For example, the inertial sensor may be a motion sensor, a thermal sensor, a vibration sensor, an optical sensor, an infrared sensor, a light sensor, an accelerometer, a tomographic sensor, or combination thereof. Other sensors or sensing elements are possible, depending on the application.

Figure 7:
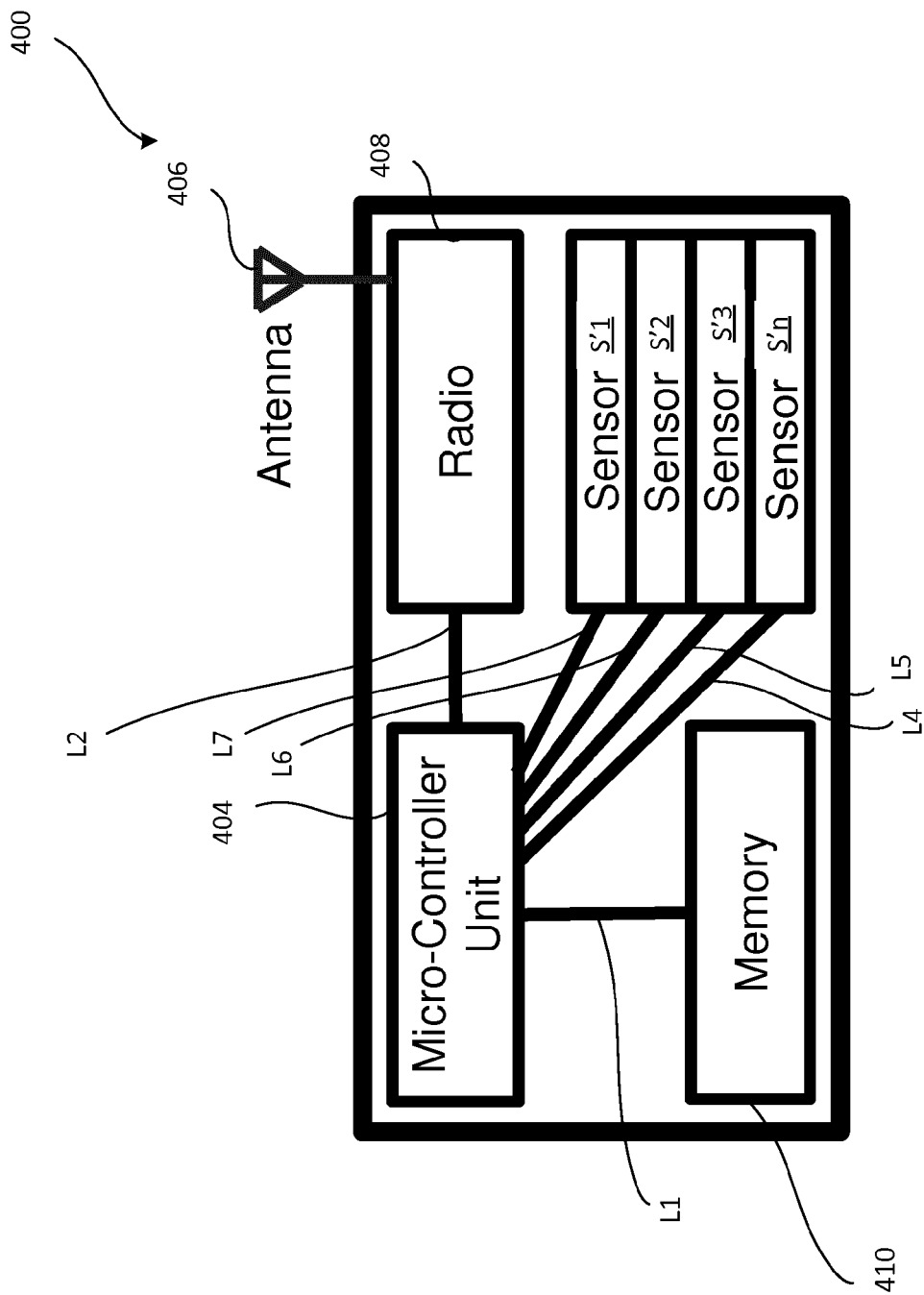
FIG. 7 is a block diagram illustrating a sensor node in accordance to a described embodiment of a disclosure.

FIG. 7 depicts a sensor node 400 of an intrusion detection system according to an exemplary embodiment of a described disclosure. The sensor node 400 includes a processor 404, an antenna 406, a communication interface 408, and a computer readable medium 410. Depending on the application, other computer implemented devices for performing other features not defined herein may be incorporated into the sensor node 400. Various system buses L1-L7 may be used for communicating between various computer implemented devices 404, 406, 408, and 410. The processor 404 may be of any type, including but not limited to a microprocessor, a microcontroller, a digital signal processor, or any combination thereof. The processor 404 may include one or more levels of caching, such as a level cache memory, one or more processor cores, and registers. Depending on the desired configuration, the processor may be of any type, including but not limited to a microprocessor (μP), a microcontroller (μC), a digital signal processor (DSP), or any combination thereof. The processor may include one more levels of caching, such as a level cache memory, one or more processor cores, and registers. The example processor cores may (each) include an arithmetic logic unit (ALU), a floating point unit (FPU), a digital signal processing core (DSP Core), or any combination thereof. An example memory controller may also be used with the processor, or in some implementations the memory controller may be an internal part of the processor.

The memory or computer readable medium 410 may be of any type including but not limited to volatile memory (such as RAM), non-volatile memory (such as ROM, flash memory, etc.) or any combination thereof. The memory may include an operating system, a communication application, and program data. The communication interface 408 allows software and data to be transferred between the computer system and other external electronic devices in the form of signals which may be, for example, electronic, electromagnetic, optical, or other signals capable of being received by the communication interface. The communication interface may be for example a modem, a network interface, a communication port, a PCM-CIA slot and card, or the like. The antenna 406 is communicatively coupled to the communication interface 408. The sensor node 400 further includes a plurality of sensors S1-Sn communicatively coupled to other internal components via the processor 404 through links L4-L7. The sensors S1-Sn may be an inertial sensor. For example, the inertial sensor may be a motion sensor, a thermal sensor, a vibration sensor, an optical sensor, an infrared sensor, a light sensor, an accelerometer, a tomographic sensor, or combination thereof. Other sensor or sensing element are possible, depending on the application.

In one embodiment, an optional display unit for displaying the event, activity, or status in a human readable format may be provided. In another embodiment, the event, activity, or status may be transmitted and remotely displayed on an electronic device. The electronic device may be for example, a cellular phone, a tablet, a PDA, a laptop, a computer, a portable audio device, a gaming device, a video device, or the like. A user interface such as a touch panel or screen, keyboard, switches, button, or any mechanical interface for controlling the base station 102 may also be provided. As illustrated, the system 100 is in a motion/vibration monitoring mode to preserve power consumption.

Figure 8:
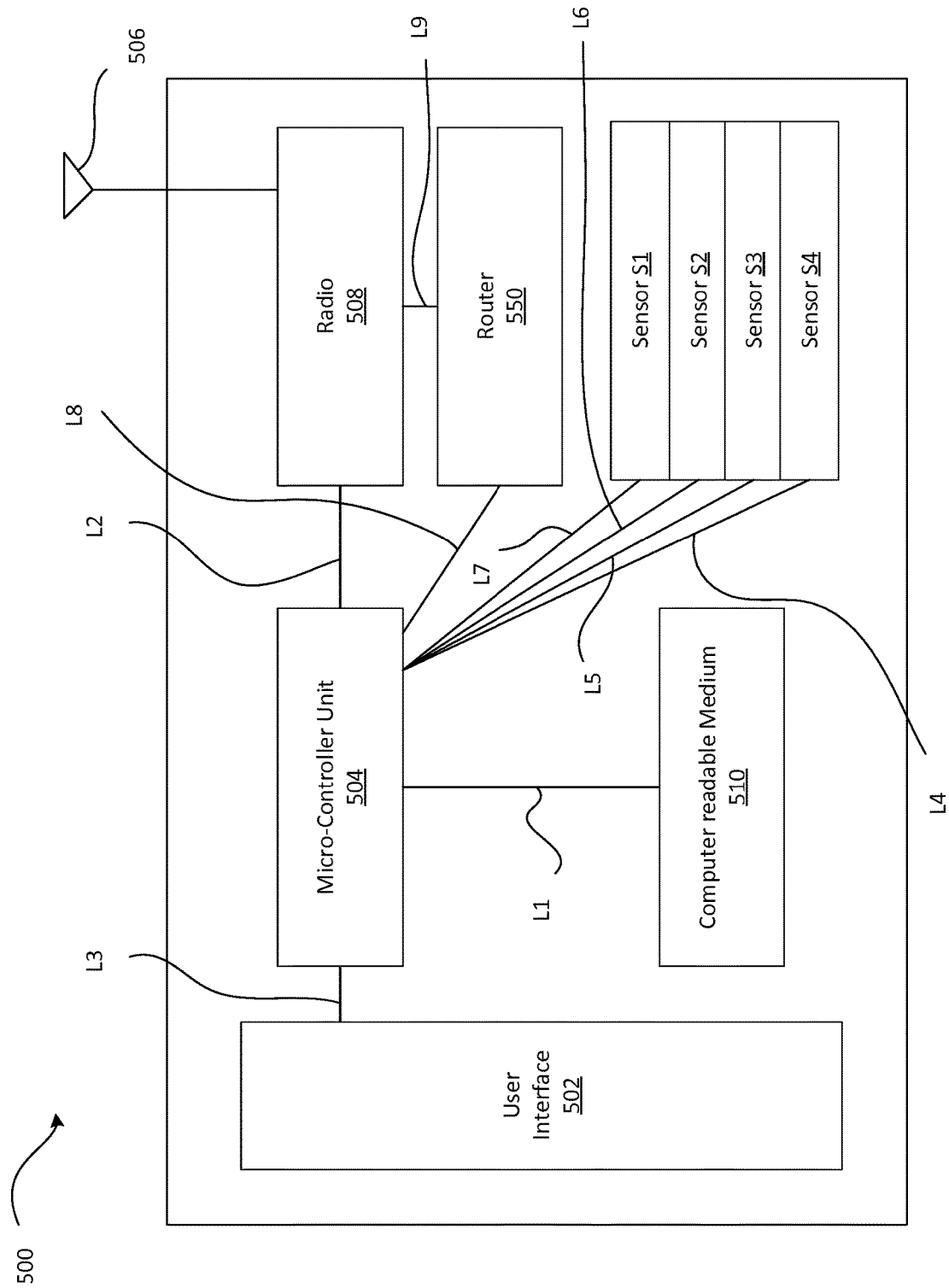
FIG. 8 is a block diagram illustrating another embodiment of a base station with an integrated router.

FIG. 8 depicts another embodiment of a base station 500 of an intrusion detection system. In contrast to the base station 300 of FIG. 6, the base station 500 includes a router 550 communicatively coupled to the micro-controller unit 504 and the radio 508 via links L8 and L9. The router 550 provides optimum communication path to other sensor nodes or to other base stations of other systems so that the communication between the base station 500 and the surrounding devices (both sensor nodes and base stations) is not compromised due to the attribute of the size and configuration of the area of interest.

The embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling with the spirit and scope of this disclosure.

While the patent has been described with reference to various embodiments, it will be understood that these embodiments are illustrative and that the scope of the disclosure is not limited to them. Many variations, modifications, additions, and improvements are possible. More generally, embodiments in accordance with the patent have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method of detection detecting an intrusion in a site comprising:
    forming a wireless network among a plurality of sensor nodes and a base station;
    setting the plurality of sensor nodes into a low power mode to periodically detect changes in received signal strength (RSS) at a site and transmit messages indicative of the changes in the RSS to the base station; and
    in response to receiving a message from at least one sensor node of the plurality of sensor nodes at the base station indicating movement at the site, transmitting a message from the base station to the at least one sensor node, the message placing the at least one sensor into a continuous transmitting mode to continuously detect changes in the RSS and transmit messages indicative of the changes in the RSS to the base station.

2. The method of claim 1, wherein the message to the base station indicating abnormal movement is an event notification.

3. The method of claim 2, wherein the event notification includes at least one of a time, a date, an identity of the sensor node, a location of the sensor node, a location of an activity event, and an alarm event.

4. The method of claim 3, wherein the event notification includes the location of an activity event, and
    wherein the activity event is at least one of a vibration event, a movement event, and a breaking event.

5. The method of claim 2, wherein the message transmitted from the base station to the at least one sensor node is an activation message, and
    wherein the activation message includes at least one of an authentication of the sensor node, a verification of the sensor node and an activation of an alarm.

6. The method of claim 1, further comprising:
    processing the sensor data from the plurality of sensor nodes to determine whether the movement is normal or abnormal movement; and
    sending a message from the base station to the at least one sensor node that places the at least one sensor node in the low power mode in response to the movement being determined to be normal movement.

7. The method of claim 6, further comprising:
    triggering an alarm event in response to the movement being determined to be abnormal movement.

8. An intrusion detection system comprising:
    a plurality of sensor nodes, each sensor node configured to collect changes in received signal strength (RSS) at a site while in a low power mode and a continuous transmitting mode and transmit messages indicative of the changes in the RSS; and
    a base station that receives the messages from the plurality of sensor nodes indicative of the changes in the RSS, the base station being configured to transmit messages to the plurality of sensor nodes to respectively place the plurality of sensor nodes in either the low power mode or the continuous transmitting mode,
    wherein, when the plurality of sensor nodes are in the low power mode, the plurality of sensor nodes transmit the messages indicative of the changes in the RSS periodically, and, when the plurality of sensor nodes are in the continuous transmitting mode, the plurality of sensor nodes transmit the messages indicative of the changes in the RSS periodically, and
    wherein, in response to receiving a message from at least one sensor node in the low power mode indicative of movement at the site, the base station transmits a message to the at least one sensor node to place the at least one sensor node in the continuous transmitting mode.

9. The intrusion detection system of claim 8 wherein the message from the base station is also transmitted to an external device receiving the issued message.

10. The intrusion detection system of claim 9 wherein the message transmitted to the base station from the at least one sensor node is an event notification.

11. The intrusion detection system of claim 10, wherein the event notification includes at least one of a time, a date, an identity of the sensor node, a location of the sensor node, a location of an activity event that has occurred, and an alarm event.

12. The intrusion detection system of claim 11, wherein the event notification includes the location of an activity event, and
    wherein the activity event is at least one of a vibration event, a movement event, and a breaking event.

13. The intrusion detection system of claim 10, wherein the message transmitted from the base station to the at least one sensor node is an activation message, and wherein the activation message includes at least one of an authentication of the sensor node, a verification of the sensor node and an activation of an alarm.

* * * * *

UNITED STATES PATENT AND TRADEMARK OFFICE
CERTIFICATE OF CORRECTION

PATENT NO. : 10,629,040 B2  
APPLICATION NO. : 16/066575  
DATED : April 21, 2020  
INVENTOR(S) : Abtin Keshavarzian, Christian Peters and Maurizio Bocca Page 1 of 1

It is certified that error appears in the above-identified patent and that said Letters Patent is hereby corrected as shown below:

In the Claims

In Claim 1, at Column 11, Line 45, delete the word "detection" between the words "of" and "detecting".

Signed and Sealed this
Twenty-fourth Day of November, 2020

Andrei Iancu
*Director of the United States Patent and Trademark Office*